(12) United States Patent
Perreault et al.

(10) Patent No.: US 12,448,230 B2
(45) Date of Patent: Oct. 21, 2025

(54) VIRTUAL SLOTS FOR INDEPENDENT CART SYSTEM

(71) Applicant: Rockwell Automation Technologies, Inc., Mayfield Heights, OH (US)

(72) Inventors: Brian M. Perreault, Stow, MA (US); Yuhong Huang, Acton, MA (US); Daniel I. Lanier, North Billerica, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 6 days.

(21) Appl. No.: 18/422,474

(22) Filed: Jan. 25, 2024

(65) Prior Publication Data
US 2025/0243015 A1    Jul. 31, 2025

(51) Int. Cl.
*B65G 54/02*    (2006.01)
*B65G 43/10*    (2006.01)
*H02K 41/03*    (2006.01)

(52) U.S. Cl.
CPC ............. *B65G 54/02* (2013.01); *B65G 43/10* (2013.01); *H02K 41/031* (2013.01); *B65G 2811/095* (2013.01)

(58) Field of Classification Search
CPC ...... B65G 54/02; B65G 43/10; G05D 1/0293; G05D 1/0223; H02K 41/031
USPC ........................................................ 198/805
See application file for complete search history.

(56) References Cited

U.S. PATENT DOCUMENTS

| | | | | |
|---|---|---|---|---|
| 3,787,716 A | * | 1/1974 | La France | H02K 41/031 104/138.1 |
| 8,616,134 B2 | * | 12/2013 | King | B65G 35/06 104/284 |
| 8,863,669 B2 | * | 10/2014 | Young | H02P 6/006 246/182 R |
| 11,829,158 B2 | | 11/2023 | Huang et al. | |
| 2006/0081446 A1 | * | 4/2006 | Lee | H02K 41/03 198/805 |
| 2014/0156063 A1 | * | 6/2014 | Neiser | B65G 43/10 700/230 |
| 2017/0229991 A1 | * | 8/2017 | Huber | G05B 7/02 |

(Continued)

FOREIGN PATENT DOCUMENTS

| | | |
|---|---|---|
| EP | 3657280 A1 | 5/2020 |
| JP | 09124141 | 5/1997 |

OTHER PUBLICATIONS

European Patent Office Search Report for Application No. 25153546.4 dated Sep. 16, 2025 (24 pages).

*Primary Examiner* — James R Bidwell
(74) *Attorney, Agent, or Firm* — Boyle Fredrickson, S.C.

(57) ABSTRACT

Virtual slots are provided to coordinate traffic flow in an independent cart system. Multiple virtual slots are defined along a length of a track for the independent cart system. The track includes multiple track segments, and the independent cart system includes a linear drive system to propel movers along the track. Each of the virtual slots are controlled to travel along the length of the track. The virtual slots are spaced apart at a first distance and are controlled to travel synchronously at a desired speed. Each of the movers is controlled to travel within one of the virtual slots at the desired speed, and each of the movers has a minimum stopping distance greater than the first distance when travelling at the desired speed.

20 Claims, 6 Drawing Sheets

(56) References Cited

U.S. PATENT DOCUMENTS

| | | | |
|---|---|---|---|
| 2019/0084781 A1* | 3/2019 | Huang | ................... B60L 13/03 |
| 2021/0088081 A1 | 3/2021 | Huang et al. | |
| 2023/0347949 A1 | 11/2023 | Huang | |

* cited by examiner

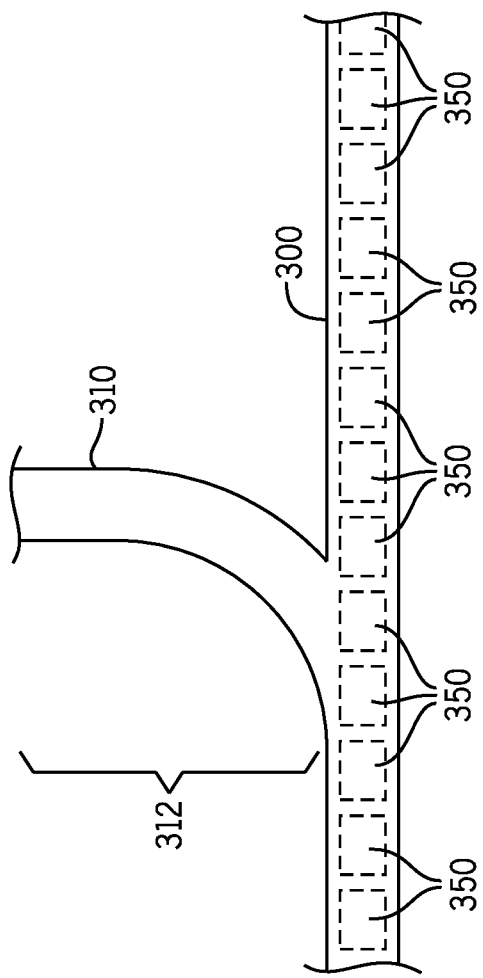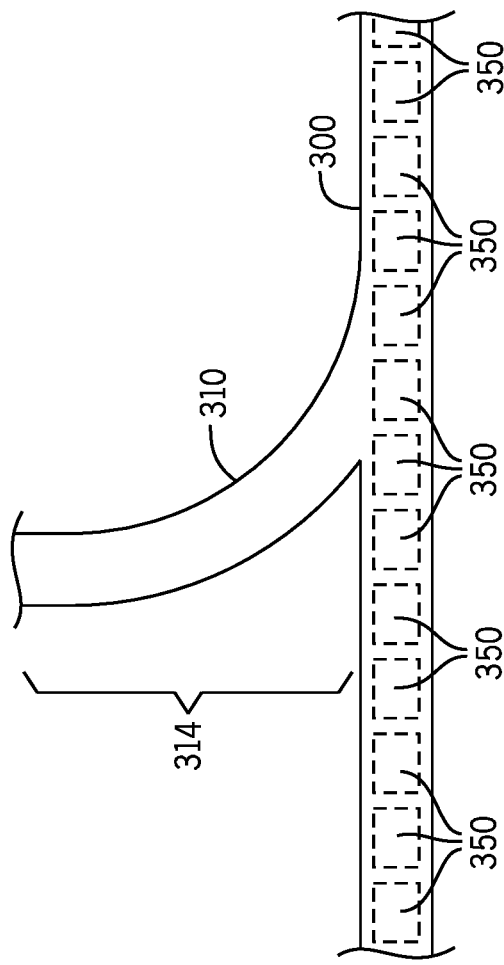

VIRTUAL SLOTS FOR INDEPENDENT CART SYSTEM

BACKGROUND INFORMATION

The subject matter disclosed herein relates to a system and method of scheduling vehicle flow in an independent cart system. More specifically, multiple virtual slots are defined along a track for the independent cart system. The virtual slots move along the track with a throughput not achievable by individual vehicles. Individual vehicles are scheduled to move into and out of the virtual slots for improved throughput.

Motion control systems utilizing independent cart technology employ a linear drive system embedded within a track and multiple vehicles, also referred to as "movers" or carts, that are propelled along the track via the linear drive system. Movers and linear drive systems can be used in a wide variety of processes (e.g. packaging, manufacturing, and machining) and can provide an advantage over conventional conveyor belt systems with enhanced flexibility, extremely high-speed movement, and mechanical simplicity. The independently controlled movers or carts are each supported on a track for motion along the track. The track is made up of a number of track segments that, in turn, hold individually controllable electric coils. Successive activation of the coils establishes a moving electromagnetic field that interacts with the movers and causes the mover to travel along the track. Sensors may be spaced at fixed positions along the track and/or on the movers to provide information about the position and speed of the movers. Each of the movers may be independently moved and positioned along the track in response to the electromagnetic fields generated by the coils.

As is known to those skilled in the art, multiple movers in an independent cart system travel along a common track. If one mover is required to stop at some point along the track, movers approaching the location of the stopped mover are unable to pass. Further, the additional movers must be brought to a stop to avoid colliding with the stopped mover.

Historically, it was known to provide a collision avoidance routine to prevent movers from colliding with a stopped mover. The collision avoidance routine monitors the velocity at which a mover is travelling and a maximum rate at which the mover is able to decelerate to determine a minimum stopping distance for the mover. If a first mover is approaching another mover that is stopped and the first mover reaches the minimum stopping distance from the stopped mover, the controller automatically overrides a commanded motion for the mover and bring the mover to a stop prior to colliding with the stopped mover.

Such collision avoidance routines are not without certain disadvantages. Movers are typically programmed to travel at high rates of speed. When a mover has a payload present, the payload adds weight to the mover and/or may be of a type that requires a more gradual deceleration than when the mover is unloaded. The maximum deceleration rate, therefore, must be reduced to accommodate the payload. The high rate of speed and reduced deceleration rate for the mover requires increased minimum distances between movers to ensure each mover has sufficient time to stop according to the collision avoidance routine. The increased spacing between movers, however, results in a reduced overall throughput for the independent cart system.

Thus, it would be desirable to provide an improved system and method for controlling operation of movers in an independent cart system that increases throughput while avoiding collisions.

BRIEF DESCRIPTION

According to a first embodiment of the invention, a method of coordinating traffic flow in an independent cart system includes assigning multiple virtual slots to travel along a first portion of a track for the independent cart system. Each of the virtual slots is controlled to continually move along the first portion of the track. A mover is assigned to a first virtual slot, selected from the plurality of virtual slots. The mover is controlled to enter the first virtual slot from a second portion of the track for the independent cart system, and motion of the mover is synchronized to travel within the first virtual slot along the first portion of the track. The mover is controlled to exit the first virtual slot to a third portion of the track for the independent cart system.

According to another embodiment of the invention, a system of coordinating traffic flow in an independent cart system includes a track, multiple movers operative to travel along the track, and a controller. The track includes at least a first portion, a second portion, and a third portion. Multiple coils are spaced along each of the first, second, and third portions of the track as part of a linear drive system for the independent cart system, and each of the movers include at least one drive magnet mounted to the mover as part of the linear drive system for the independent cart system. Multiple virtual slots are defined along the first portion of the track. Each of the virtual slots defines a space along the first portion of the track, has a first spacing defined between adjacent virtual slots, are controlled to move synchronously along the first portion of the track, and selectively receives one of the movers from the second portion of the track. The controller is operative to assign a first mover to a first virtual slot, command the first mover to enter the first portion of the track as the first virtual slot passes a connection with the second portion of the track, and command the first mover to exit the first portion of the track as the first virtual slot passes a connection with a third portion of the track.

According to still another embodiment of the invention, a method of coordinating traffic flow in an independent cart system includes defining multiple virtual slots along a length of a track for the independent cart system. The track includes multiple track segments, and each track segment includes multiple coils spaced along the track segment and a segment controller to regulate current in the coils. The coils are a first portion of a linear drive system for the independent cart system. Each of the virtual slots are controlled to travel along the length of the track. The virtual slots are spaced apart at a first distance and are controlled to travel synchronously at a desired speed. Operation of multiple movers is controlled for the movers to travel along the track. Each of the movers includes at least one drive magnet, where the at least one drive magnet is a second portion of the linear drive system. An electromagnetic field sequentially generated by the coils interacts with a magnetic field generated by the at least one drive magnet on each mover to propel the corresponding mover along the track. Each of the movers is controlled to travel within one of the plurality of virtual slots at the desired speed, and each of the movers has a minimum stopping distance greater than the first distance when travelling at the desired speed.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 5 is a top plan view of an exit transition region between a high throughput section and an additional section of the independent cart system;

FIG. 6 is a top plan view of an entrance transition region between the additional section and the high throughput section of the independent cart system;

Figure 1:
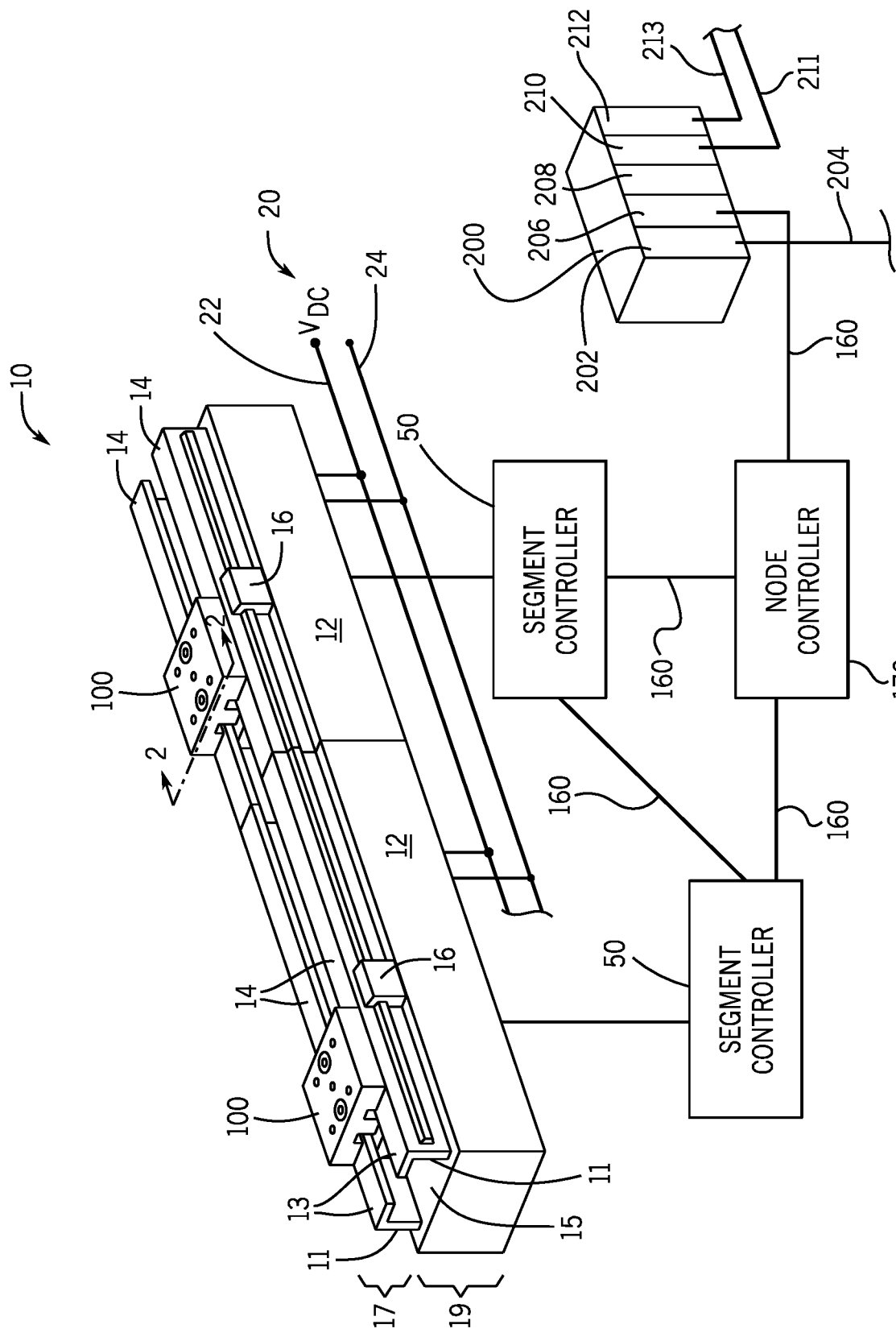
FIG. 1 is a is a schematic representation of an exemplary control system for an independent cart system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes an improved system and method for coordinating traffic flow and controlling operation of movers in an independent cart system that increases throughput while avoiding collisions. The independent cart system includes a track and multiple movers propelled along the track by a linear drive system. A portion of the track is designated as a high throughput zone. In this high throughput zone, multiple slots are defined. Each slot is a length along the track in which one mover may be positioned. The slots are controlled in unison to start, stop, and travel along the high throughput zone. Additional portions of the track may generally be separate from the high throughput zone, but connections are formed between the additional portions of track and the high throughput zone, such that movers may transition between the additional portions of the track and the high throughput zone.

When a mover is to travel along the high throughput zone, it is assigned to one of the slots. The mover is initially located in one of the additional portions of the track. A transition region between the additional portion of the track and the high throughput zone is used to synchronize the speed of the mover with the speed of the slots in the high throughput zone. Further, motion of the mover in the transition region is coordinated with the arrival of the slot at the end of the transition region such that the mover enters the slot from the additional portion of track as the slot passes and at the same speed as the slot is travelling. While the mover is located within the high throughput zone, it continues to travel synchronously with the slots. The mover may stay in its original slot or transition forward or backward to adjacent slots as long as no other mover is present in an adjacent slot. As a mover reaches another additional portion of track to which it is commanded, the mover transitions from the high throughput zone to the new portion of the track. The mover maintains its synchronization with the slot in which it was travelling until it is clear of the high throughput zone and entirely located within the new portion of the track.

Because the slots are controlled in unison and because the mover is controlled to move synchronously with one of the slots, the minimum distance between slots may be less than the minimum distance that would otherwise be required between movers. Movers may move into and out of slots adjacent to another mover without adjusting the spacing between movers. The reduced distance between movers provides for an increased throughput of movers along the high throughput zone.

Turning initially to FIG. 1, an exemplary transport system for moving articles or products includes a track 10 made up of multiple segments 12. According to the illustrated embodiment, multiple segments 12 are joined end-to-end to define the overall track configuration. The illustrated segments 12 are both straight segments having generally the same length. It is understood that track segments of various sizes, lengths, and shapes may be connected together to form the track 10 without deviating from the scope of the invention. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes, right-hand switches, left-hand switches, and various combinations thereof. The width of the track 10 may be greater in either the horizontal or vertical direction according to application requirements. The movers 100 will travel along the track and take various orientations according to the configuration of the track 10 and the relationships discussed herein may vary accordingly.

According to the illustrated embodiment, the track receives power from a distributed DC voltage. A DC bus 20 receives a DC voltage, VDC, from a DC supply and conducts the DC voltage to each track segment 12. The illustrated DC bus 20 includes two voltage rails 22, 24 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated external to the track segment 12, it is contemplated that the DC bus 20 would extend within the lower portion 19 of the track segment. Each track segment 12 includes connectors to which either the DC supply or another track segment may be connected such that the DC bus 20 may extend for the length of the track 10. Optionally, each track segment 12 may be configured to include a rectifier section (not shown) and receive an AC voltage input. The rectifier section in each track segment 12 may convert the AC voltage to a DC voltage utilized by the corresponding track segment.

Each track segment 12 includes an upper portion 17 and a lower portion 19. The upper portion 17 is configured to carry the movers 100 and the lower portion 19 is configured to house the control elements. As illustrated, the upper portion 17 includes a pair of rails 14 extending longitudinally along the upper portion 17 of each track segment 12 and defining a channel 15 between the two rails. Clamps 16 affix to the sides of the rails 14 and secure the rails 14 to the lower portion 19 of the track segment 12. Each rail 14 is generally L-shaped with a side segment 11 extending in a generally orthogonal direction upward from the lower portion 19 of the track segment 12, and a top segment 13 extending inward toward the opposite rail 14. The top segment 13 extends generally parallel to the lower portion 19 of the track segment 12 and generally orthogonal to the side segment 11 of the rail 14. Each top segment 13 extends toward the opposite rail 14 for only a portion of the distance between rails 14, leaving a gap between the two rails 14. The gap and the channel 15 between rails 14 define a guideway along which the movers 100 travel.

According to one embodiment, the surfaces of the rails 14 and of the channel 15 are planar surfaces made of a low friction material along which movers 100 may slide. The contacting surfaces of the movers 100 may also be planar and made of a low friction material. It is contemplated that the surface may be, for example, nylon, Teflon®, aluminum, stainless steel and the like. Optionally, the hardness of the surfaces on the track segment 12 are greater than the contacting surface of the movers 100 such that the contacting surfaces of the movers 100 wear faster than the surface of the track segment 12. It is further contemplated that the contacting surfaces of the movers 100 may be removably mounted to the mover 100 such that they may be replaced if the wear exceeds a predefined amount. According to still other embodiments, the movers 100 may include low-friction rollers to engage the surfaces of the track segment 12. Optionally, the surfaces of the channel 15 may include different cross-sectional forms with the mover 100 including complementary sectional forms. Various other combinations of shapes and construction of the track segment 12 and mover 100 may be utilized without deviating from the scope of the invention.

Figure 2:
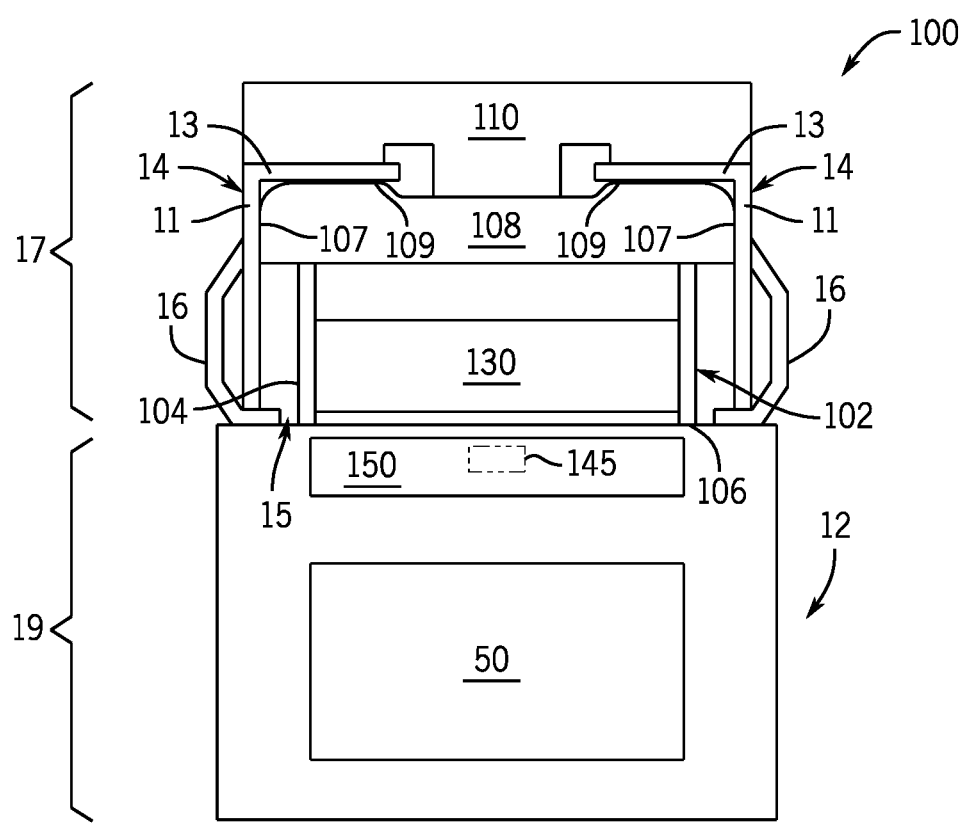
FIG. 2 is a sectional view of one embodiment of a mover and track segment included in the linear drive system taken at 2-2 of FIG. 1.
Figure 3:
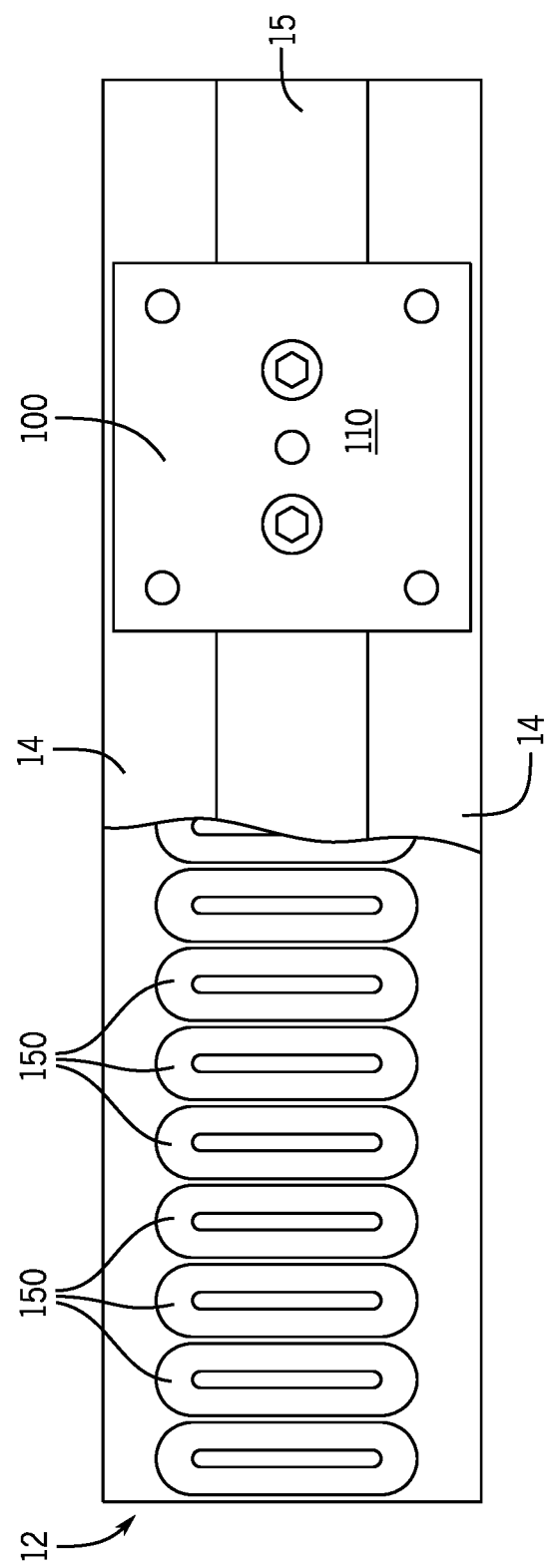
FIG. 3 is a partial top cutaway view of the mover and track segment of FIG. 1.

The mover 100 is carried along the track 10 by a linear drive system. The linear drive system is incorporated in part on each mover 100 and in part within each track segment 12. A first portion of the linear drive system includes one or more drive magnets 130 mounted to each mover 100. With reference to FIG. 2, the drive magnets 130 are arranged in a block on the lower surface of each mover. The linear drive system further includes a series of coils 150 spaced along the length of the track segment 12. With reference also to FIG. 3, the coils 150 may be positioned within a housing for the lower portion 19 of the track segment 12 and below the surface of the channel 15. The coils 150 are energized sequentially according to the configuration of the drive magnets 130 present on the movers 100. The sequential energization of the coils 150 generates a moving electromagnetic field that interacts with the magnetic field of the drive magnets 130 to propel each mover 100 along the track segment 12.

A segment controller 50 is provided within each track segment 12 to control the linear drive system and to achieve the desired motion of each mover 100 along the track segment 12. The segment controller 50 for each track segment 12 regulates current in the coils 150 to generate an electromagnetic field. Further, the segment controller 50 selectively energizes coils 150 along a length of the track segment 12 to create a moving electromagnetic field. This moving electromagnetic field interacts with the magnetic field generated by the drive magnets 130 on each mover 100 to cause the movers 100 to travel along the track segment. Regulating the current such that the electromagnetic field moves along the track segment 12 in a first direction causes the mover 100 to travel in the first direction, and regulating the current such that the electromagnetic field moves along the track segment 12 in the opposite direction causes the mover 100 to travel in the opposite direction.

Although illustrated in FIG. 1 as blocks external to the track segments 12, the arrangement is to facilitate illustration of interconnects between controllers. As shown in FIG. 2, it is contemplated that each segment controller 50 may be mounted in the lower portion 19 of the track segment 12. Each segment controller 50 is in communication with a node controller 170 which is, in turn, in communication with an industrial controller 200. The industrial controller may be, for example, a programmable logic controller (PLC) configured to control elements of a process line stationed along the track 10. The process line may be configured, for example, to fill and label boxes, bottles, or other containers loaded onto or held by the movers 100 as they travel along the line. In other embodiments, robotic assembly stations may perform various assembly and/or machining tasks on workpieces carried along by the movers 100. The exemplary industrial controller 200 includes: a power supply 202 with a power cable 204 connected, for example, to a utility power supply; a communication module 206 connected by a network medium 160 to the node controller 170; a processor module 208; an input module 210 receiving input signals 211 from sensors or other devices along the process line; and an output module 212 transmitting control signals 213 to controlled devices, actuators, and the like along the process line. The processor module 208 may identify when a mover 100 is required at a particular location and may monitor sensors, such as proximity sensors, position switches, or the like to verify that the mover 100 is at a desired location. The processor module 208 transmits the desired locations of each mover 100 to a node controller 170 where the node controller 170 operates to generate commands for each segment controller 50.

A position feedback system provides knowledge of the location of each mover 100 along the length of the track segment 12 to the segment controller 50. According to one embodiment of the invention, the position feedback system includes one or more position magnets mounted to the mover 100. According to another embodiment of the invention, the position feedback system utilizes the drive magnets 130 as position magnets. Position sensors 145 are positioned along the track segment 12 at a location suitable to detect the magnetic field generated by the drive magnets 130. According to the illustrated embodiment, the position sensors 145 are located below or interspersed with the coils 150. The sensors 145 are positioned such that each of the drive magnets 130 are proximate to the sensor as the mover 100 passes each sensor 145. The sensors 145 are a suitable magnetic field detector including, for example, a Hall Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 145 outputs a feedback signal provided to the segment controller 50 for the corresponding track segment 12 on which the sensor 145 is mounted. The position sensors 145 are spaced apart along the length of the track. According to one aspect of the invention, the position sensors 145 are spaced apart such that adjacent position sensors 145 generate a feedback signal which is offset from each other by ninety electrical degrees (90°). Multiple position sensors 145 are, therefore, generating feedback signals in tandem for a single mover 100 as the mover is travelling along the track 10.

Each controller (i.e., the segment controller 50, the node controller 170, and the programmable logic controller 200) includes at least one processor and non-transitory memory. The non-transitory memory stores instructions for execution by the processor within the controller. It is contemplated that the processor and non-transitory memory may each be a single electronic device or formed from multiple devices. The processor may be a microprocessor. Optionally, the processor and/or the non-transitory memory may be integrated on a field programmable gate array (FPGA) or an application specific integrated circuit (ASIC). The instructions include one or modules, control programs, and/or an operating system to achieve the desired functions of the corresponding controller. Although certain features of the present invention are discussed herein as being performed by specific controllers, in alternate embodiments, some features may be performed by another controller within the system.

Figure 4:
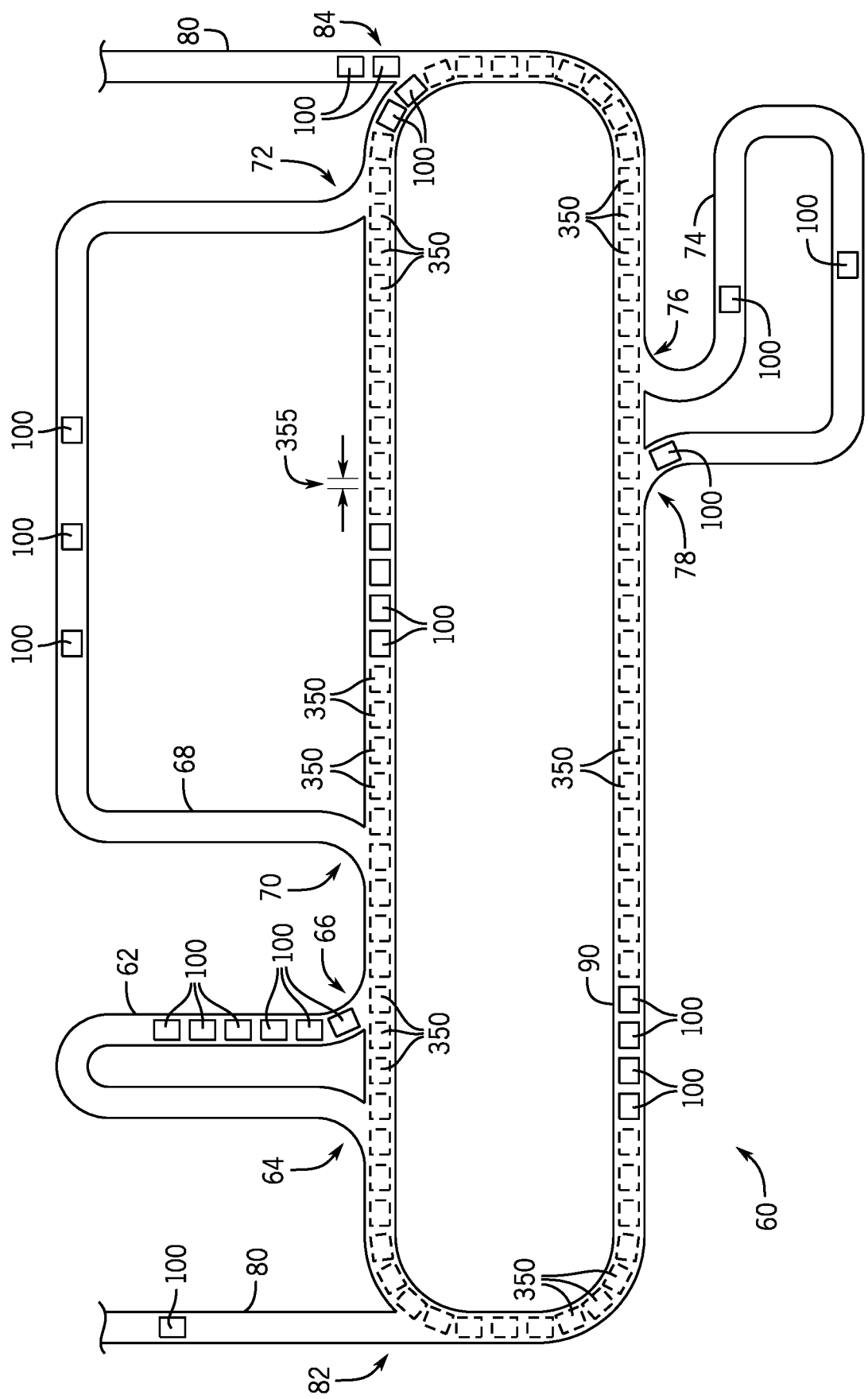
FIG. 4 is a top plan view of a portion of an exemplary track layout for the independent cart system.

Turning next to FIG. 4, a portion of an exemplary track layout 60 for the independent cart system is illustrated. The exemplary track layout 60 includes a main loop 90. The main loop 90 has multiple side loops extending from the main loop. A first side loop 62 has a first transition zone 64 and a second transition zone 66. The first transition zone 64 is provided at a switch which selectively directs movers 100 to either continue along the main loop 90 or to travel onto the first side loop 62. The second transition zone 66 is provided at another switch which allows movers 100 present on the first side loop 62 to rejoin the main loop 90. A second side loop 68 has a first transition zone 70 and a second transition zone 72. The first transition zone 70 is provided at a switch which selectively directs movers 100 to either continue along the main loop 90 or to travel onto the second side loop 68. The second transition zone 72 is provided at another switch which allows movers 100 present on the second side loop 68 to rejoin the main loop 90. A third side loop 74 has a first transition zone 76 and a second transition zone 78. The first transition zone 76 is provided at a switch which selectively directs movers 100 to either continue along the main loop 90 or to travel onto the third side loop 74. The second transition zone 78 is provided at another switch which allows movers 100 present on the third side loop 74 to rejoin the main loop 90. An external loop 80 is also illustrated. The external loop 80 may be a single loop or may include connecting paths to multiple other tracks located at different locations within a facility. The external loop 80 has a first transition zone 82 and a second transition zone 84. The first transition zone 81 is provided at a switch which selectively directs movers 100 to either continue along the main loop 90 or to travel onto the external loop 80. The second transition zone 84 is provided at another switch which allows movers 100 present on the external loop 80 to join the main loop 90. The illustrated track layout 60 is intended to be exemplary and not limiting. It is contemplated that any number of side loops may extend from the main loop 90. Further, multiple first transition zones may be provided where tracks extending from the first transition zones combine externally from the main loop 90 and return to the main loop at a single second transition zone. Similarly, a single first transition zone may branch out along multiple tracks external from the main loop 90 and return at multiple second transition zones to the main loop 90. Various other track configurations may be implemented according to an application's requirements without deviating from the scope of the invention.

In operation, the main loop 90 is utilized to provide a high-throughput section for the illustrated track layout 60. Within the main loop 90, multiple virtual slots 350 are defined. The virtual slots 350 define a space to which a mover 100 may be selectively assigned and are spaced around the entire length of the main loop 90. Movers 100 travelling around the main loop 90 enter the main loop synchronously with a virtual slot 350 passing by an entrance transition zone, and movers 100 exit the main loop 90 at exit transition zones. The main loop 90 is a first portion of the overall track layout 60. Each side loop 62, 68, 74 and the external loop 80 are additional portions of the overall track layout.

As shown in FIG. 4, the virtual slots 350 are defined around the length of the main loop 90. Each of the virtual slots 350 defines a space, or distance, along the track and is not a physical slot. Each virtual slot 350 is sized to accommodate a mover 100 within the slot, and each virtual slot 350 is spaced apart by a first distance 355 from an adjacent virtual slot 350. According to the illustrated embodiment, each of the movers 100 has a uniform size. As a result, the virtual slots 350 similarly have a uniform size. Optionally, the main loop 90 may be configured to accommodate movers 100 having varying sizes. A track layout 60 which includes movers 100 of two different sizes, for example, may define virtual slots 350 having the same two different sizes. The virtual slots 350 may alternately be a first size and a second size, providing an equal number of slots for movers of the first size and movers of the second size to enter the main loop 90. Alternately, the distribution of movers 100 within the independent cart system of different sizes may be uneven. The majority of movers 100 may be the first size, while a minority of movers 100 may be the second size. The virtual slots 350 may be defined along the main loop 90 with a similar ratio of slots at each size as the ratio between movers 100 having either the first or second size. According to still another aspect of the invention, the virtual slots 350 may include a slot having a certain size according to the frequency at which the slot is required along the main loop 90. For example, the illustrated track layout 60 may primarily utilize movers 100 having the first size that travel along the main loop 90 as well as the first, second, and third side loops 62, 68, 74. A mover 100 having the second size may primarily travel along the external loop 80 but occasionally be required to interact with the illustrated portion of the track layout 60. In such an application, the majority of virtual slots 350, such as nine out of every ten slots, may be sized to accommodate a mover 100 having the first size, while a small number of virtual slots 350, such as one out of every ten slots, may then be defined to accommodate a mover 100 of the second size. Still other configurations of slot sizing may be utilized without deviating from the scope of the invention.

At power up, all of the movers 100 within the independent cart system are at a standstill. Similarly, the virtual slots 350 are initially considered to be at a standstill. One of the controllers will manage operation of the virtual slots 350. The industrial controller 200 or the node controller 170 may be configured to manage operation of the virtual slots 350. Optionally, still another controller such as a fleet controller for the entire independent cart system or a localized controller to manage traffic along the main loop 90 may be provided. As the independent cart system starts up, the virtual slots 350 are accelerated from standstill to a desired velocity. A uniform acceleration and a uniform desired speed are applied to each of the virtual slots 350. Each of the virtual slots 350 maintain a synchronous relationship with each other, such that the distance 355 between adjacent slots 350 and the speed at which each of the slots 350 is traveling remains identical to the speed of the other slots as the slots are accelerated from standstill to the desired speed.

If movers 100 are present along the main loop 90 at power up, each mover 100 is assigned to one of the virtual slots 350 while the main loop 90 is at standstill. As the virtual slots 350 accelerate to the desired speed, the movers 100 assigned to one of the virtual slots 350 accelerate along with and remain in the assigned virtual slot 350. The movers 100 will continue to travel with the virtual slot 350 in which they are assigned until commanded to another location within the independent cart system.

Movers 100 that are not present within the main loop 90 at power-up will need to enter and exit the main loop 90. With reference next to FIGS. 5 and 6, transition regions 312, 314 between a high throughput track 300 and an adjacent track 310 are illustrated. In FIG. 5, an exit transition region 312 is shown which allows movers 100 to transition from the high throughput track 300 to the adjacent track 310. The high throughput track 300 includes virtual slots 350 defined along the length of the high throughput track. Although no movers 100 are shown in FIG. 5, a mover 100 could be assigned to and travelling within one of the virtual slots 350. If the mover 100 is commanded to a location along the adjacent track 310, the mover 100 will travel along the high throughput track 300 until it reaches the switch between the high throughput track and the adjacent track 310. As the mover 100 reaches the switch, it moves out of the virtual slot 350 to which it was assigned and onto the adjacent track 310. Within the exit transition region 312, the mover 100 changes speed from the velocity at which it was travelling along the high throughput track 300 and to the commanded velocity for the adjacent track 310. Within the exit transition region 312, the mover 100 is also controlled to ensure that enough spacing exists between the mover 100 and any adjacent mover to ensure a safe stopping distance for the speed at which the movers 100 are travelling along the adjacent track 310. The commanded velocity along the adjacent track 310 may be less than or greater than the velocity of the movers 100 travelling along the high throughput track. However, the spacing between movers 100 along the adjacent track 310 is sufficient to ensure traditional collision avoidance methods are effective at preventing a mover 100 from colliding with another mover stopped along the adjacent track 310. In contrast, movers 100 travelling along the high throughput track 300 are spaced apart at the distance 355 between virtual slots which is less than the minimum distance required for a mover 100 to come to a complete stop from the speed at which it is travelling within the high throughput track section 300.

According to one aspect of the invention, the exit transition region 312 may include a queueing segment and an acceleration segment. Movers 100 transitioning from the high throughput track section 300 may need to slow and/or stop within the queuing segment to allow other movers 100 time to clear the transition region 312 and establish sufficient separation between movers 100 for the desired speed of travel along the adjacent track 310. The controller may cause movers 100 to exit the high throughput track 300 and enter the queueing section. As a mover 100 has sufficient space from the adjacent mover in front, it enters the acceleration segment of the transition region 312 and accelerates to the desired speed of the adjacent track 310, then leaves the transition region 312. In certain applications, the high throughput track 300 may allow movers 100 to travel at a higher rate of speed and at tighter spacing than the movers 100 along the adjacent track 310. The queuing segment may fill with movers 100 as it waits for the first-in mover 100 to clear the acceleration segment and consequently clear the transition region 312. If the queuing segment is full as a mover 100 approaches an exit transition region 312, the controller may command a mover 100 present on the high throughput track 300 to stay on the high throughput track and travel in a loop around the high throughput track until the mover 100 returns to the adjacent track 310. In this manner, the queueing segment has an opportunity to clear at least a portion of the movers 100 present and allow the next mover 100 to enter the queueing region on a subsequent pass by the exit transition region 312.

In FIG. 6, an entrance transition region 314 is shown which allows movers 100 to transition from the adjacent track 310 to the high throughput track 300. As previously discussed, the virtual slots 350 are commanded to continually travel along the high throughput track 300. A mover 100 present on the adjacent track 310 may be commanded to another area of the independent cart system, and the illustrated adjacent track 310 is connected to the other area of the independent cart system by the high throughput track 300. The controller responsible for managing the virtual slots 350 assigns the mover 100 to an empty virtual slot. When a mover 100 is assigned to a virtual slot 350, the mover utilizes the entrance transition region 314 to synchronize movement with the virtual slot 350 and to enter the slot as it passes the transition region 314. Within the entrance transition region 314, the mover 100 changes speed from the velocity at which it was travelling along the adjacent track 310 to the commanded velocity for the virtual slots 350 along the high throughput track 300. The commanded velocity along the adjacent track 310 may be less than or greater than the velocity of the slots 350 travelling along the high throughput track. The mover 100 may accelerate or decelerate along the transition region 314 to match the velocity, and the position of the mover 100 is controlled such that the mover 100 flows into the virtual slot 350 as it passes the adjacent track 310.

According to one aspect of the invention, the entrance transition region 314 may include a queueing segment and an acceleration segment. Movers 100 transitioning from the adjacent track 310 to the high throughput track section 300 may need to slow and/or stop within the queuing segment to allow other movers 100 time to clear the transition region 314. Preferably, a mover 100 is assigned to a vacant slot 350 that is approaching the end of the adjacent track 310 and that each mover 100 within the queueing segment is assigned to a vacant slot behind the slot 350 in which a mover 100 immediately in front of is assigned. If, however, a mover 100 enters the queuing segment of the transition region 314 and cannot enter its assigned slot 350 as it passes the first time due to another mover 100 present in the queueing region, the mover 100 may simply remain in the queueing region until the assigned slot 350 is scheduled to next pass the end of the adjacent track 310. As an assigned slot 350 in the high throughput track 300 approaches the end of the adjacent track 310, the mover 100 assigned to the slot 350 accelerates up to the commanded speed for the virtual slots 350 and adapts its position within the entrance transition region 314 such that the motion of the mover 100 is coordinated to the motion of the virtual slot 350 and the mover 100 enters the virtual slot 350 as it passes the adjacent track 310.

Figure 7:
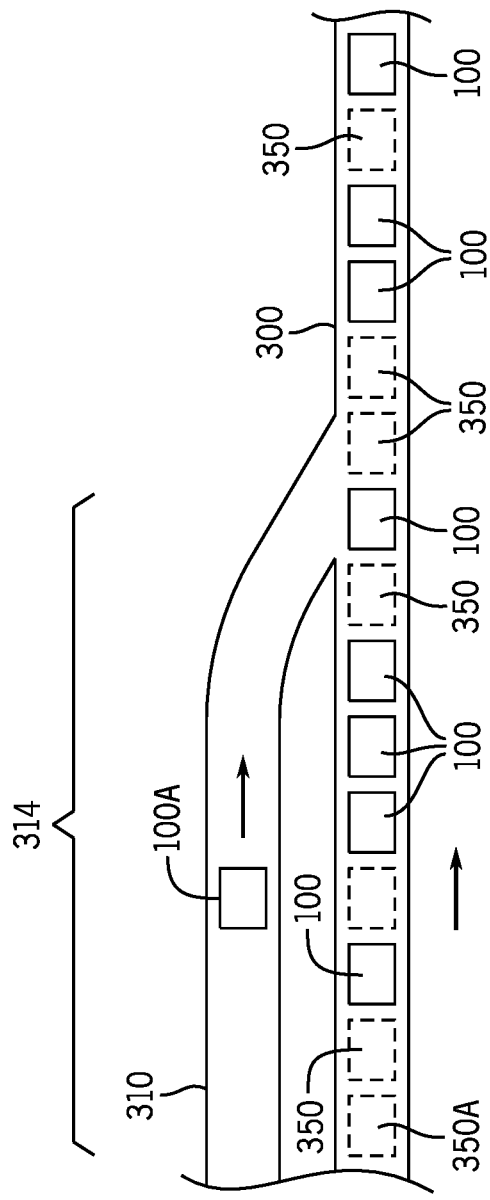
FIG. 7 is a top plan view of an entrance transition region between an additional section and a high throughput section with a mover assigned to a vacant slot.
Figure 8:
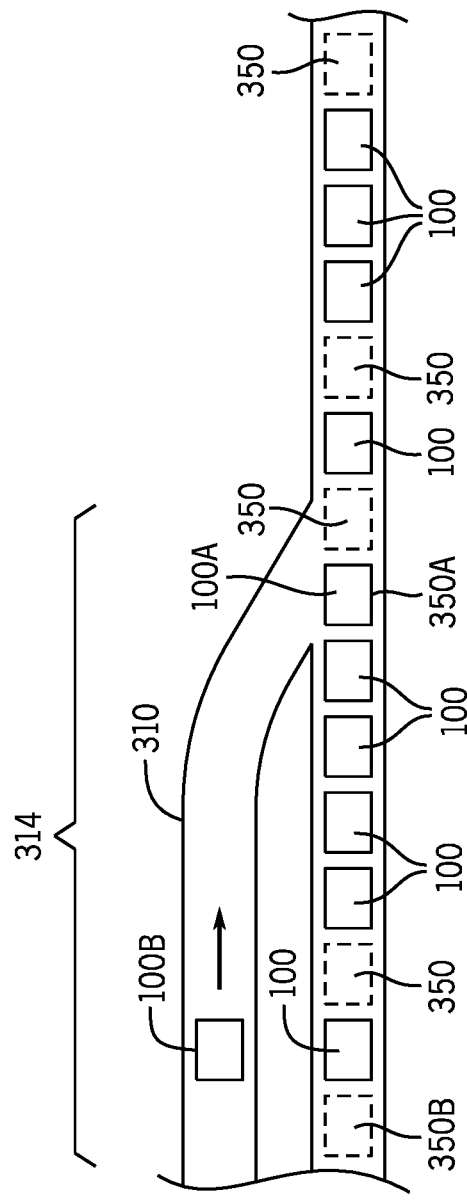
FIG. 8 is a top plan view of the entrance transition region of FIG. 7 with the mover entering the assigned slot.

With reference also to FIGS. 7 and 8, an example of a designated mover 100A entering an assigned slot 350A is shown. In FIG. 7, the designated mover 100A has been commanded to travel along the high throughput track 300. In the illustrated embodiment, many movers 100 are already present on the high throughput track 300. However, a vacant slot 350A is assigned to the designated mover 100A. The designated mover 100A coordinates its position and velocity within the entrance transition region 314 such that it enters the high throughput track 300 as the assigned slot 350A reaches the end of the adjacent track 310. FIG. 8 illustrates the first designated mover 100A just entering its assigned slot 350A. As further shown in FIG. 8, a second mover 100B has also been commanded to the high throughput track 300 and a second vacant slot 350B has been assigned as the location in which the second mover 100B will enter the high throughput track 300. This process continues for additional movers 100 needing to enter the high throughput track 300.

The portion, or portions, of the track layout 60 providing high throughput regions allow for the higher density of movers 100 as a result of the synchronous operation of the virtual slots 350. Along other portions of the track layout 60, movers 100 are independently controlled. The movers 100 may travel at different speeds or have different acceleration/deceleration rates along different portions of the track. The different speeds and different acceleration/deceleration rates may be a function of the physical construction of the mover 100, a payload present on the mover, or other operating conditions. As a mover 100 is being controlled along the other track portions, a minimum stopping distance is determined. The minimum stopping distance is the distance required for the mover 100 to come to a stop from its present speed at the maximum deceleration rate. Under normal operating conditions, a first mover 100 is controlled such that it maintains a minimum stopping distance from another mover in front of the first mover along the track. If the second mover comes to a stop, the first mover 100 will begin decelerating at the minimum stopping distance such that it avoids colliding with the second mover.

In contrast, movers 100 travelling along the first portion, or high throughput region, of the track layout 60 are permitted to travel at a distance from an adjacent mover that is less than the minimum stopping distance. Because each mover 100 in the first portion of the track is assigned to and travels with one of the virtual slots 350, the each mover 100 is only spaced apart from another mover by the distance 355 between virtual slots. Additionally, because each of the virtual slots 350 are controlled in tandem, all of the movers 100 along the high throughput region of the track are also controlled in tandem. The synchronous operation of each mover 100 along the high throughput region means that a first mover 100 does not need to worry about a second mover 100 stopping along the track unless the first mover 100 is also stopping. This coordinated motion of the virtual slots 350 and each mover 100 travelling within the virtual slots allows movers 100 to be more densely packed along the first portion of the track and, thereby, increasing the throughput of movers 100 along this first portion of the track.

Although the illustrated track layout 60 in FIG. 4 includes a single high throughput region 90, it is contemplated that multiple high-throughput regions may be defined at different portions of the track layout 60. The high-throughput regions may be joined by intermediary track portions or by switches directly connecting two adjacent high-throughput sections.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method of coordinating traffic flow in an independent cart system, the system comprising:
   assigning a plurality of virtual slots to travel along a first portion of a track for the independent cart system;
   controlling each of the plurality of virtual slots to continually move along the first portion of the track;
   assigning a mover to a first virtual slot, selected from the plurality of virtual slots;
   controlling the mover to enter the first virtual slot from a second portion of the track for the independent cart system;
   synchronizing motion of the mover to travel within the first virtual slot along the first portion of the track; and
   controlling the mover to exit the first virtual slot to a third portion of the track for the independent cart system.

2. The method of claim 1, wherein:
   the second portion of the track is separate from but connects to the first portion of the track, and
   the mover enters the first virtual slot as the first virtual slot moves past the second portion of the track.

3. The method of claim 2, further comprising the step of synchronizing a speed of the mover to a speed of the first virtual slot along a transition region on the second portion of the track, wherein the first mover enters the first virtual slot from the transition region at the speed of the first virtual slot.

4. The method of claim 1, wherein:
   the third portion of the track is separate from but connects to the first portion of the track, and
   the mover exits the first virtual slot as the first virtual slot moves past the third portion of the track.

5. The method of claim 4 further comprising the steps of:
controlling the mover along a transition region on the third portion of the track to continue travelling at a speed of the first virtual slot until the mover completely exits the first virtual slot; and
changing a speed of the mover within the transition region from the speed of the first virtual slot to a desired speed along the third portion of the track.

6. The method of claim 1, wherein:
each of the plurality of virtual slots are controlled to move along the first portion of the track at a desired velocity,
each of the plurality of virtual slots are spaced apart by a first distance, and
when the mover is controlled to travel within the first virtual slot, the mover travels at the desired velocity and the mover has a stopping distance greater than the first distance.

7. The method of claim 1 further comprising the step of controlling the mover forward or reverse to a second virtual slot as the mover travels along the first portion of the track, wherein the second virtual slot is adjacent to the first virtual slot.

8. The method of claim 1, wherein each of the plurality of virtual slots are initially controlled to move along the first portion of the track at a first speed, the method further comprising the steps of:
receiving a second speed command for each of the plurality of virtual slots, and
synchronously transitioning each of the plurality of slots between the first speed and the second speed, wherein the mover is present in the first virtual slot and the motion of the mover remains synchronized with the first virtual slot as each of the plurality of slots transitions between the first speed and the second speed.

9. A system of coordinating traffic flow in an independent cart system, the system comprising:
a track including at least a first portion, a second portion, and a third portion, wherein a plurality of coils are spaced along each of the first, second, and third portions of the track as part of a linear drive system for the independent cart system;
a plurality of movers operative to travel along the track, wherein each of the plurality of movers include at least one drive magnet mounted to the mover as part of the linear drive system for the independent cart system;
a plurality of virtual slots defined along the first portion of the track, wherein each of the plurality of virtual slots:
defines a space along the first portion of the track,
has a first spacing defined between adjacent virtual slots,
are controlled to move synchronously along the first portion of the track, and
selectively receives one of the plurality of movers from the second portion of the track; and
a controller operative to:
assign a first mover, selected from the plurality of movers, to a first virtual slot, selected from the plurality of virtual slots,
command the first mover to enter the first portion of the track as the first virtual slot passes a connection with the second portion of the track, and
command the first mover to exit the first portion of the track as the first virtual slot passes a connection with a third portion of the track.

10. The system of claim 9, wherein the controller is further operative to command the first mover to move at a common speed with the plurality of virtual slots along a transition region of the second portion of the track.

11. The system of claim 10, wherein the controller is further operative to:
control the mover along a transition region on the third portion of the track to continue travelling at a speed of the first virtual slot until the mover completely exits the first virtual slot; and
change a speed of the mover within the transition region from the speed of the first virtual slot to a desired speed along the third portion of the track.

12. The system of claim 9, wherein:
each of the plurality of virtual slots are controlled to move along the first portion of the track at a desired velocity, and
when the first mover is controlled to travel within the first virtual slot, the first mover travels at the desired velocity and the first mover has a stopping distance greater than the first spacing.

13. The system of claim 9 wherein the controller is further operative to command the mover forward or reverse to a second virtual slot as the mover travels along the first portion of the track, wherein the second virtual slot is adjacent to the first virtual slot.

14. A method of coordinating traffic flow in an independent cart system, the method comprising the steps of:
defining a plurality of virtual slots along a length of a track for the independent cart system, wherein:
the track includes a plurality of track segments,
each track segment includes a plurality of coils spaced along the track segment and a segment controller to regulate current in the plurality of coils, and
the plurality of coils are a first portion of a linear drive system for the independent cart system;
controlling each of the plurality of virtual slots to travel along the length of the track, wherein:
the plurality of virtual slots are spaced apart at a first distance, and
the plurality of virtual slots are controlled to travel synchronously at a desired speed; and
controlling operation of a plurality of movers to travel along the track, wherein:
each of the plurality of movers includes at least one drive magnet,
the at least one drive magnet is a second portion of the linear drive system,
an electromagnetic field sequentially generated by the plurality of coils interacts with a magnetic field generated by the at least one drive magnet on each mover to propel the corresponding mover along the track,
each of the plurality of movers is controlled to travel within one of the plurality of virtual slots at the desired speed, and
each of the plurality of movers has a minimum stopping distance greater than the first distance when travelling at the desired speed.

15. The method of claim 14, wherein:
the track is a first portion of the track for the independent cart system;
the independent cart system includes a second portion of the track separate from but connected to the first portion of the track,
at least one of the plurality of virtual slots is an empty virtual slot; and a first mover enters the empty virtual slot from the second portion of the track as the empty virtual slot moves past the second portion of the track.

16. The method of claim 15, further comprising the step of synchronizing a speed of the first mover to the desired speed of the empty virtual slot along a transition region on the second portion of the track, wherein the first mover enters the empty virtual slot from the transition region at the desired speed making the empty virtual slot a full virtual slot.

17. The method of claim 16, wherein:
the independent cart system includes a third portion of the track separate from but connected to the first portion of the track, and
the first mover exits the full virtual slot as the full virtual slot moves past the third portion of the track.

18. The method of claim 17, further comprising the steps of:
controlling the first mover along a transition region on the third portion of the track to continue travelling at the desired speed until the first mover completely exits the full virtual slot; and
changing a speed of the first mover within the transition region from the desired speed of the plurality of virtual slots to a desired speed along the third portion of the track.

19. The method of claim 15, further comprising the step of controlling the first mover forward or reverse to a second virtual slot as the first mover travels along the first portion of the track.

20. The method of claim 14, further comprising the steps of:
receiving a second speed command for each of the plurality of virtual slots, and
synchronously transitioning each of the plurality of slots between the desired speed and the second speed, wherein each of the plurality of movers are controlled to continue travelling within one of the plurality of virtual slots as each of the plurality of slots transitions between the desired speed and the second speed.

* * * * *